United States Patent [19]

Kawamoto et al.

[11] Patent Number: 5,014,800

[45] Date of Patent: May 14, 1991

[54] MOTOR DRIVING DEVICE PROVIDED WITH DECELERATOR AND ELECTRIC VEHICLE

[75] Inventors: Mutsumi Kawamoto; Hidemitsu Inagaki; Satoru Tanaka, all of Anjo, Japan

[73] Assignee: Aisin AW Co., Ltd., Aichi, Japan

[21] Appl. No.: 290,203

[22] Filed: Dec. 27, 1988

[30] Foreign Application Priority Data

Jun. 29, 1988 [JP] Japan .................................. 63-161898

[51] Int. Cl.[5] .............................................. B60K 1/00
[52] U.S. Cl. ..................................... 180/65.5; 180/65.6
[58] Field of Search ..................... 180/65.5, 65.6, 65.7; 280/96.1; 188/18 A

[56] References Cited

U.S. PATENT DOCUMENTS

| | | | |
|---|---|---|---|
| 3,812,928 | 5/1974 | Rockwell et al. | 180/65.6 |
| 3,892,300 | 7/1975 | Hopeman et al. | 180/65.6 |
| 3,933,217 | 1/1976 | Eichinger | 180/65.6 |

*Primary Examiner*—Andres Kashnikow
*Assistant Examiner*—Richard Camby
*Attorney, Agent, or Firm*—Varndell Legal Group

[57] ABSTRACT

A motor driving device provided with a decelerator according to the present invention is so structured that a motor rotational shaft 6a and an output rotational shaft 9 are coaxially disposed within a casing 1 thereof, and planetary gears 18, 19, 20, 21, and 22 connect the two rotational shafts 6a and 9.

According to the present invention, a special wall disposed between the motor rotational shaft 6a and the output rotational shaft 9 and for supporting the two rotational shafts 6a and 9 becomes needless to be provided for the casing 1. As a result, the overall length of the casing 1 can be reduced and the shape of the casing 1 can be simplified. Furthermore, the power of the electric motor 6 can be effectively transmitted to the output rotational shaft 9 by the planetary gear decelerating device so that the driving device can output large torque.

4 Claims, 7 Drawing Sheets

MOTOR DRIVING DEVICE PROVIDED WITH DECELERATOR AND ELECTRIC VEHICLE

BACKGROUND OF THE INVENTION

The present invention relates to a motor driving device provided with a decelerator which is called, for example, "Geared Motor".

In electric vehicles, if a motor is provided for the wheels respectively, the driving torque for the wheel can be independently controlled, causing an effective control at the time of performing a small turn or preventing slippage. Therefore, a study upon electric vehicles whose four wheels are independently driven has been progressed, resulting a various disclosures.

Hitherto, an electric vehicle such as fork-lift or golf-cart employes a wheel motor disposed to each wheel as driving means. Such wheel motor generally employs a motor integrally provided with a gear decelerating device. The reason for such employment lies in that a high efficiency and high speed type motor can be used as a low speed and large torque type motor by combining such motor and decelerator. In a usual electric vehicles, the wheels thereof are rotated at the number of revolution of substantially 1000 rpm, while a motor arranged to be rotated at 2000 rpm is employed by the above-described type of vehicles.

As a usual type of the motor which is integrally provided with the above-described type of gear decelerating device, a motor of the type is known which is constituted in such a manner that the electric motor and the gear decelerating device are formed as individual units and the thus-formed units are integrally coupled to each other. In such structure, the gear decelerating device is structured so as to realize several stepped deceleration by using an external gear thereof.

In electric vehicles, the wheels thereof tend to move vertically due to uneveness of the road or the wheels can be turned (steered) laterally when the vehicles are driven. Therefore, in a case where a motor driving device is respectively provided for the wheels, the motor driving device needs to be arranged not to be interfered with the wheels when the wheels are moved or turned as described above. As a result, the space for providing the motor driving device is involved to be limited. That is, the reduction of the size of the motor driving device is necessary. In order to satisfy such necessity, the size of the motor needs to be reduced as much as possible.

However, in the conventional motor which is integrally provided with the gear deceleration device, the electric motor and the decelerating device respectively comprises a heavy casing since the same are independently formed as units. Furthermore, the casing for the decelerating device cannot b reduced to a satisfactory size since it needs to accommodate a multiplicity of external gears. In addition, in such external geared decelerating device, since two gears are secured in the axial direction to one rotational shaft, the overall length thereof involves to be lengthened. Therefore, there is a limit to reduce the overall body size of the motor.

To this end, a structure can be considered to be employed which is constituted in such a manner that the electric motor and the gear decelerating device are accommodated within a casing. However, in the conventional motor which is integrally provided with the gear decelerating device, the rotational shaft for the motor and the rotational shaft for each of the decelerating steps are individually supported by a pair of bearings. In order to support these bearings, an wall for supporting the bearings needs to be provided in addition to the outer wall of the casing. Therefore, the shape of the casing can be complicated, and the overall length cannot be shortened to a satisfactory size. In addition, a problem arises that such bearings cause mechanical loss which can lead to a fact that the output torque is reduced.

SUMMARY OF THE INVENTION

An Object of the present invention is to reduce the size of the motor driving device provided with a decelerator and the size of an electric vehicle as much as possible.

Another object of the present invention is to make the motor driving device provided with the decelerator and to make the electric vehicle output a large output torque.

In order to achieve the above-described objects, a motor driving device provided with the decelerator comprises: a motor rotational shaft and an motor output shaft which are coaxially provided in a casing thereof; and a planetary gear decelerator which connects the rotational shaft and the output shaft.

An electric vehicle according to the present invention comprises the above-described motor driving device provided with the decelerator which is secured to each wheel.

Since the motor driving device having the above-described structure and according to the present invention is arranged in such a manner that an end of the motor rotational shaft and an end of the output rotational shaft support and rotate each other, a supporting wall for supporting the two rotational shaft becomes needless to be provided. As a result, the overall length of the casing can be shortened and the shape of the casing can be as well simplified.

Furthermore, the motor driving device provided with the decelerating device according to the present invention is arranged in such a manner that either of the motor rotational shaft or the output rotational shaft is fitted and secured within a recessed portion provided in the other motor rotational shaft or the output rotational shaft so as to be rotated relatively to each other. Furthermore, the other ends of the two shafts are supported by bearings. As a result, the motor rotational shaft and the motor output shaft can be disposed on one axis. Furthermore, since these two rotational shafts are connected by a planetary gear decelerating device, the gears of the decelerating device are provided on one axis, but the gears are not provided in the vertical direction.

As a result, the vertical distance of the casing can be as well reduced.

Furthermore, since the power of the electric motor can be efficiently transmitted to the output rotational shaft through the planetary gear decelerating device and the number of the bearing can be limited small, mechanical loss can be prevented and high output torque can be generated.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

FIG. I is a vertical cross-section of an embodiment in which a motor driving device provided with a decelerating device according to the present invention is applied to a wheel motor of an electric vehicle.

DESCRIPTION OF THE PREFERRED EMBODIMENTS

Embodiments will now be described with reference to the drawings.

Figure 1:
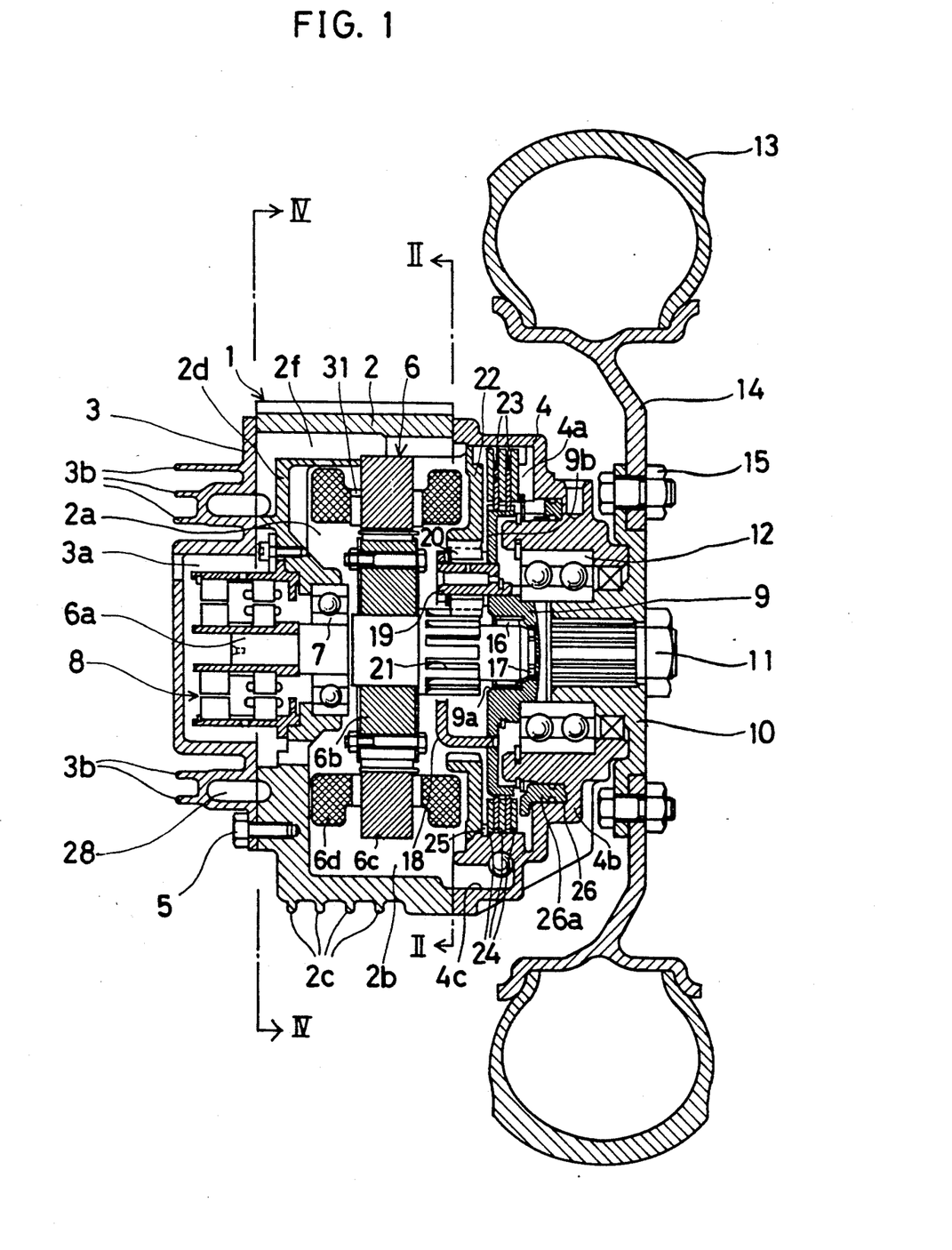

Referring to FIG. 1, a motor driving device provided with a decelerator according to the present invention integrally accommodates in a casing 1 thereof an electric motor 6 and a planetary gear decelerating devices 18 to 22. Furthermore, an end of a motor rotational shaft 6a is fitted within a recessed portion in an output rotational shaft 9 and is supported by bearings 16 and 17, whereby the motor rotational shaft 6a and the output rotational shaft 9 are disposed on one axis. Therefore, bearings 7 and 12 simply need to be disposed on both sides of the motor rotational shaft 6a and the output rotational shaft 9 which are disposed on one axis. Furthermore, disc brakes 23 to 26 can be disposed only necessitating reduced spaces.

The structure will be further in detail described with reference to FIGS. 1 to 5.

Figure 2:
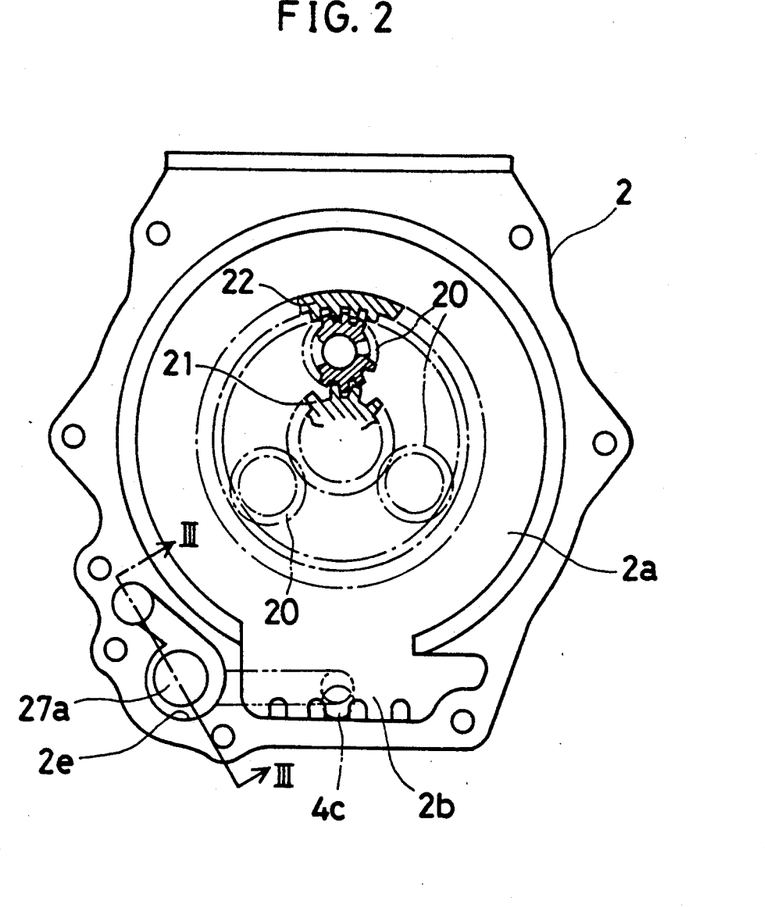
FIG. 2 is a vertical cross-sectional view taken along line II—II in FIG. 1.
Figure 3:
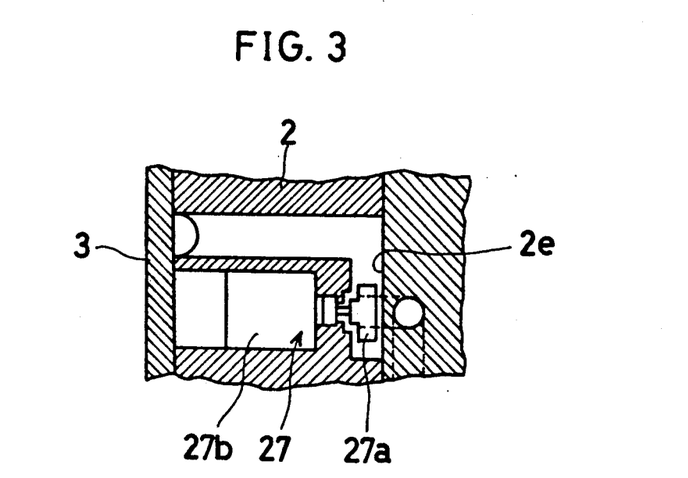
FIG. 3 is a cross-sectional view taken along line III—III in FIG. 2.
Figure 4:
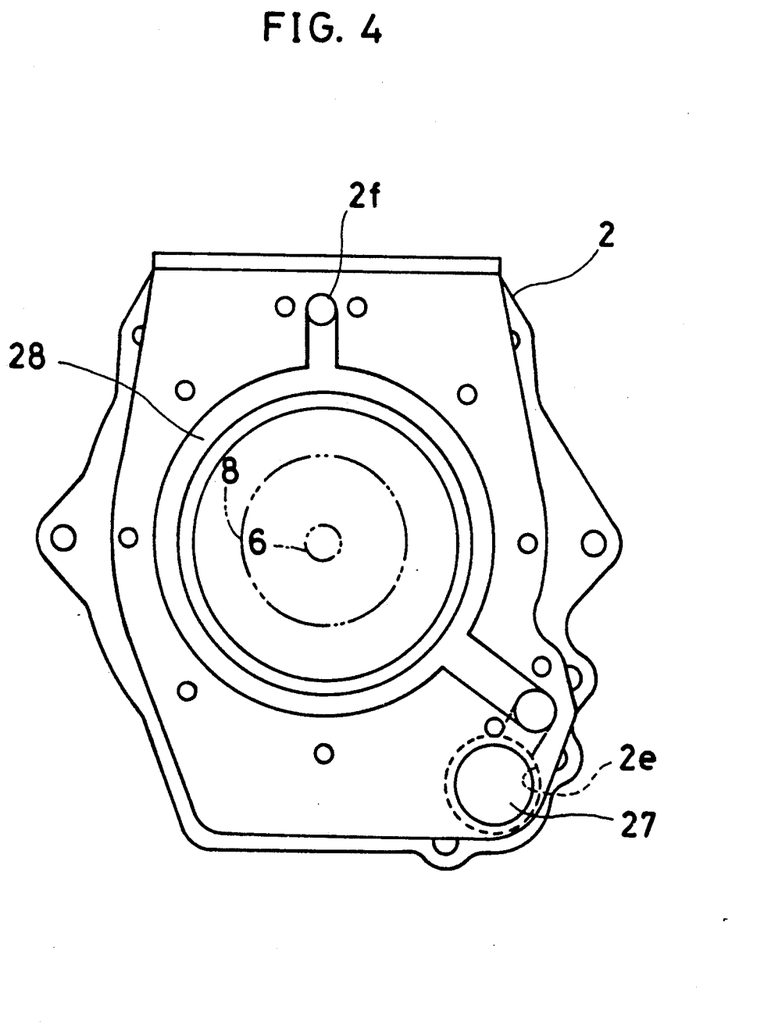
FIG. 4 is a vertical cross-sectional view taken along line IV—IV in FIG. 1.

The casing 1 is, as shown in FIGS. 1 and 2, structured by coupling a main body 2 and right and left side walls 3 and 4 by a multiplicity of bolts 5. On the inside of the main body 2 are provided a space 2a having a substantially circular cross-sectional shape and an oil reservoir 2b connected to and disposed below this space 2a. On the outer surface of the main body 2, a multiplicity of cooling fins 2c are provided. In the left side wall 3, a space 3a having a circular cross-sectional shape which is smaller than the circular cross-sectional shape of the space 2a is provided. On the outer surface of the left side walls 3, a multiplicity of cooling fins 3b are also provided. In the right side wall 4, a space 4a having the circular cross-sectional shape which has substantially the same diameter as that of the space 2a is provided.

In the space 2a in the main body 2, an electric motor 6 is accommodated, and the motor rotational shaft 6a of this electric motor 6 is rotatably supported at the position on the side wall 2d of the main body 2 by a bearing 7. A rotor 6b of the electric motor 6 is secured to the motor rotational shaft 6a and a stator 6c of the electric motor 6 is secured to an inner wall of the space 2a.

In the space 3a in the left side wall 3, a motor speed sensor 8 is accommodated, and a movable portion of this motor speed sensor 8 is secured to the left end of the motor rotational shaft 6a, while the secured side of this motor speed sensor 8 is secured to a side wall 2d of the main body 2.

In a space 4a in the right side wall 4, an output rotational shaft 9 is accommodated, and a wheel hub is spline-engaged with this output rotational shaft 9, this rotational shaft 9 being secured so as not to be moved in the axial direction. This output rotational shaft 9 and the wheel hub 10 are rotatably supported by a bearing 12 at the position on the side wall 4b. A wheel 14 securing a tire 13 is, by a bolt and nut 15, secured to the wheel hub 10.

In the left side end portion of the output rotational shaft 9, a recessed portion 9a having a circular cross-sectional shape and concentrically disposed to this output rotational shaft 9 and a radially expanding flange portion 9a are formed.

A right side end of the motor rotational shaft 6a is fitted within the flange portion 9a of output rotational shaft 9, this right side end is supported in the radial direction by a bearing 17, while the same is supported in the thrust direction by a bearing 16. That is, the motor rotational shaft 6a and the output rotational shaft 9 are disposed on one axis and are arranged to be able to rotate with respect to each other.

A carrier 18 is fitted adjacent to the root portion of a flange portion 9b. A predetermined number of shafts 19 are arranged, at same intervals, in the circumferential direction between the flange portion 9b and the carrier 18. Planetary gears 20 are respectively and rotatably supported by the corresponding shafts 19. The planetary gear 20 is disposed between a sun gear 21 formed around the motor rotational shaft 6a and a ring gear 22 secured to the inner wall of the right side wall portion 4 so as to be always interlocked with the two gears 21 and 22. As a result, a planetary gear decelerating device connecting the motor rotational shaft 6a and the output rotational shaft 9 according to the present invention is constituted by the carrier 18, shaft 19, planetary gear 20, sun gear 21 and the ring gear 22.

Two brake discs 23 are spline-engaged at the circumferential end of the flange portion 9b so as to be sildable only in the axial direction. In the inner wall of the right side wall portion 4 and at the position confronting the circumferential end of the flange portion 9b, three frictional discs 24 are spline-engaged in such a manner that same can be slid only in the axial direction. In this case, the most left side frictional disc 24 is arranged not to further move to the left by an annular key 25. The brake discs 23 and the frictional discs 24 are alternately disposed o as to partially overlap each other. An end surface of a piston 26a of each of the brake cylinders 26 disposed at several positions on the side wall of the right side wall portion 4 is arranged so as to confront the side surface of the right end frictional disc 24. This brake cylinders 26 are connected to a brake power generating device such as master cylinder (omitted from illustration). Thus, a brake device is constituted by these brake discs 23, frictional discs 24, and brake cylinders 26.

Thus, the electric motor 6, planetary gear device, output rotational shaft 9 and the brake device are accommodated in one casing 1.

On the other hand, the oil reservoir 2b disposed in the lower portion of the main body 2 is connected to a passage 4c formed in the right side wall portion 4. As shown in FIG. 2, this passage 4c is connected to a pump chamber 2e formed in the main body 2. As can be clearly seen from FIG. 3, the pump chamber 2e is provided with a blade 27a of an oil pump 27 which comprises a centrifugal pump. This blade 27a is arranged to be rotated by a driving motor 27b secured to the main body 2. Furthermore, the pump chamber 2e is connected to an oil cooling chamber 28 disposed between the main body 2 and the left side wall portion 3. As can be clearly seen from FIG. 4, the oil cooling chamber 28 is formed annularly. The upper potion of this oil cooling chamber 28 is arranged to be connected to the upper portion of the space 2a of the main body 2 by a passage 2f formed in the main body 2. Thus, a lengthened oil passage connected from the oil reservoir 2b to the upper portion of the space 2a is formed in the main body 2 and the left side wall portion 3. This lengthened oil passage, space 2a, and the oil reservoir 2b are filled with oil.

Figure 5:
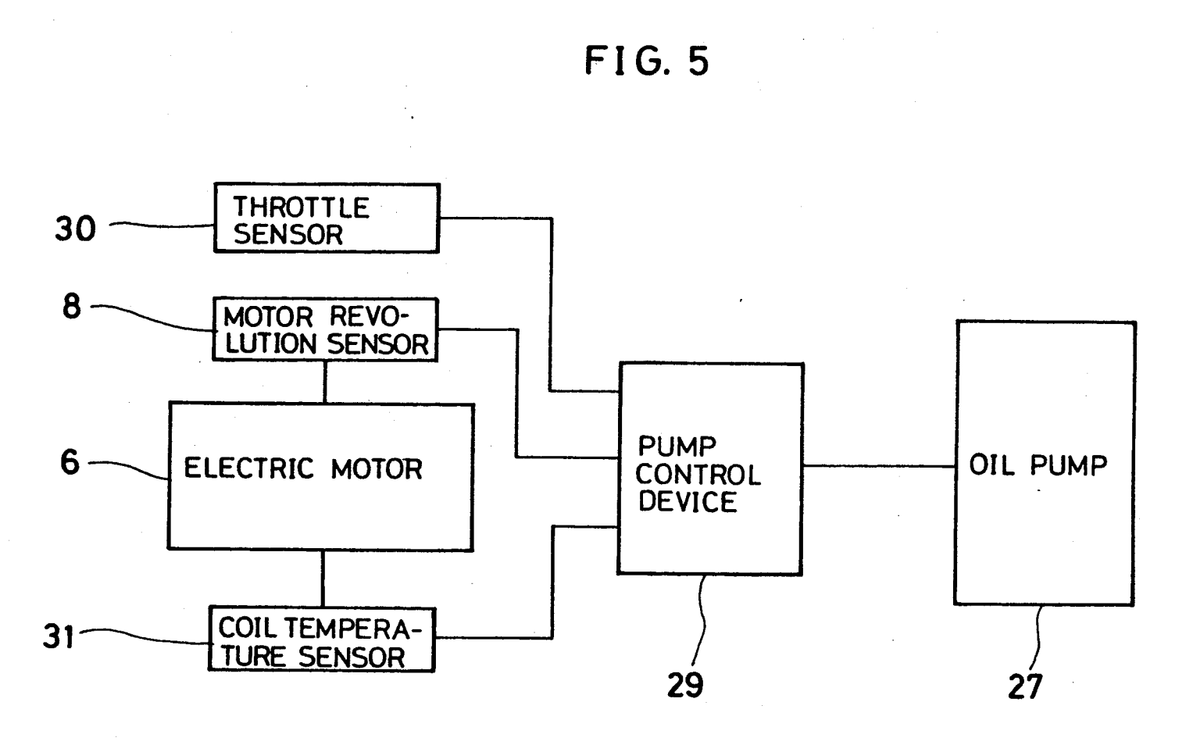
FIG. 5 is a block diagram for controlling drive of an oil pump provided in a cooling circuit for the motor driving device provided with the decelerating device.

As shown in FIG. 5, the oil pump 27 is, by means of a coil, connected to a pump control device 29. To this pump control device 29, a coil temperature sensor 30, motor speed sensor 8, and a control parameter sensor of a coil temperature sensor 31 embedded in a coil 6d of the stator 6c are respectively connected.

Thus, a cooling device is constituted by the oil reservoir 2b, oil pump 27, pump control device 29 and the control parameter sensor.

Next, an operation of this embodiment will be described.

When an accelerating pedal (omitted from illustration) is applied with a foot, a throttle (omitted from illustration) is opened by a degree corresponding to the degree of the accelerating pedal movement so that an electric current passes through the coil 6d of the electric motor 6 by an amount corresponding to the degree of opening of the throttle. As a result, the electric motor 6 is rotated, causing the rotation of the motor rotational shaft 6a. In this case, since the current passing through the coil 6d is controlled by a control device (omitted from illustration) depending upon accelerator operation signal, an output signal from the motor speed sensor 8a, and a forward movement signal from a forward and rearward movement setting portion (omitted from illustration), the motor rotational shaft 6a is forward rotated at a predetermined speed.

The rotation of the motor rotational shaft 6a is transmitted, via the sun gear 21, to the planetary gear 20 so that the planetary gear 20 is rotated relative to the shaft 19. As a result, the planetary gear 20 is rotated relative to the axial center of the motor rotational shaft 6a with, being. engaged with the teeth of the ring gear (reaction member) 22. The output rotational shaft 9 is rotated by the rotation of this planetary gear 20 transmitted via the carrier 18 and the flange portion 9b. In this case, the speed of the output rotational shaft 9 is decelerated by the planetary gear decelerating device at a predetermined deceleration ratio with respect to the rotational speed of the motor rotational shaft 6a. Furthermore, since the motor rotational shaft 6a and the output rotational shaft 9 are rotated in the same direction, the relative rotational speed becomes reduced, causing the load involved to be applied to the bearing 16 to be reduced. Therefore, a short life bearing can be used and the reduced size device can be employed.

When the output rotational shaft 9 is rotated, the tires 13 are rotated via the wheel hubs 10 and the wheels 14. As a result, the vehicle is moved forward. If the accelerating pedal is further operated, the rotational speed of the electric motor 6 is increased so that the vehicle speed is increased.

When the brake pedal (omitted from illustration) is operated for the purpose of braking the vehicle, a braking oil pressure is introduced into the brake cylinder 26. This braking oil pressure causes the piston 26a to move to the left so that the friction plate 24 is pushed. As a result, the friction plate 24 is caused to abut against the brake disc 23 so that the vehicle is braked.

If the vehicle is intended to move rearward, it can be realized by setting the forward/rearward movement setting portion to the rearward movement mode.

When an electric current passes through the coil 6d, heat is generated from this coil 6d. In order to overcome this heat generation, the oil pump is operated. As a result, oil in the oil reservoir 2b is circulated through the passage 4c, pump chamber 2e, oil cooling chamber 28, passage 2f and the space 2a, and is again returned to the oil reservoir 2b. Thus, the oil is sprinkled on the coil 6d and the rotor 6b to cool them. In this case, although the oil is heated due to the heat of the coil 6d and the rotor 6b, the heat of oil radiates outside through the casing 1 when it, as described above, circulates through the lengthened oil passage. In particular, heat can effectively radiate in the oil reservoir 2b and the oil cooling chamber 28 by the cooling fins 2c and 3b. Then, the oil whose temperature has been lowered again cools the electric motor 6.

As described above, the lengthened passage through which the oil passes forms a cooling circuit for the electric motor 6.

As shown in FIG. 5, the oil pump 27 is controlled by the pump control device 29 depending upon output signals from the corresponding motor speed sensor 8, throttle sensor 30, and the coil temperature sensor 31.

Next, a method of controlling such oil pump 27 will be described.

Figure 6A:
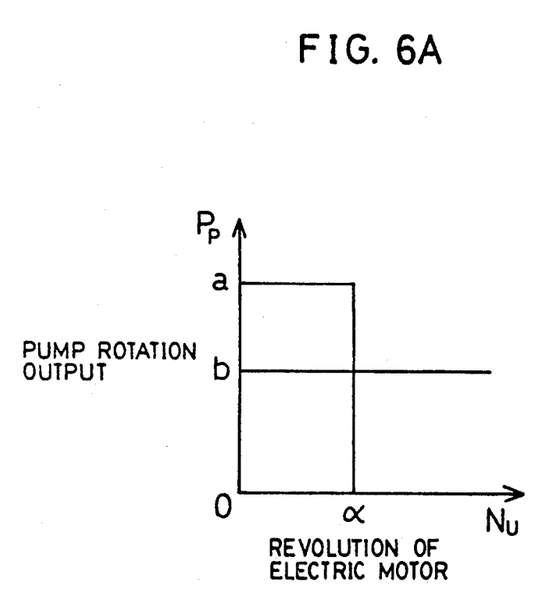
FIGS. 6A to 6B illustrate a method of controlling the operation of the oil pump.
Figure 6B:
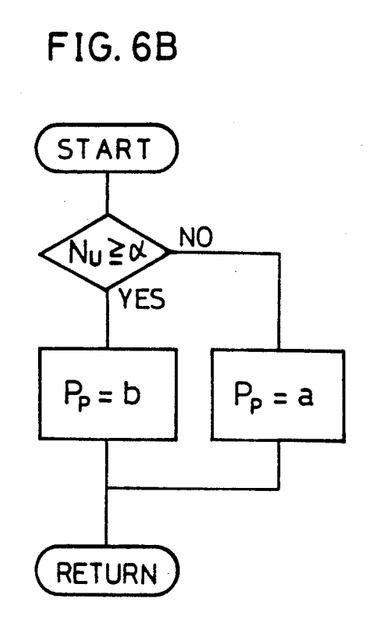

FIGS. 6A to 6B illustrate a method of controlling the oil pump 27 using the rotational speed of the electric motor 6 as the control parameter.

As shown in FIG. 6A, the oil pump 27 is operated when the electric motor 6 is rotated. In this case, pump rotation output $P_p$ is set to relatively large and constant value $P_p = a$ when rotational speed $N_u$ of the electric motor 6 is smaller than constant rotational speed a. When rotational speed $N_u$ of the electric motor 6 becomes a level larger than constant rotational speed a, pump rotation output $P_p$ is set to $P_p = b$ which is smaller than value a. As described above, the oil pump 27 is controlled in such a manner that the output thereof is changed to two steps.

On the other hand, when the rotational speed of the electric motor 6 becomes high, the oil is strongly stirred. The electric motor 6 can be cooled as a result of the stir of this oil. As described above, by controlling the oil pump 27, the amount of oil to be supplied becomes large when the electric motor rotates at a low speed and thereby the cooling effect by the stir of the oil is limited, while the same becomes small when the rotational speed of the electric motor 6 becomes large and thereby the cooling effect by the stir of the oil becomes is improved.

Therefore, the electric motor can be effectively cooled without any waste of energy. A flow chart for controlling this oil pump 27 can be expressed as shown in FIG. 6B.

In this state, another control can be arranged in which the pump rotation output is changed to three steps or more, causing a possibility of a further precise control.

Figure 7A:
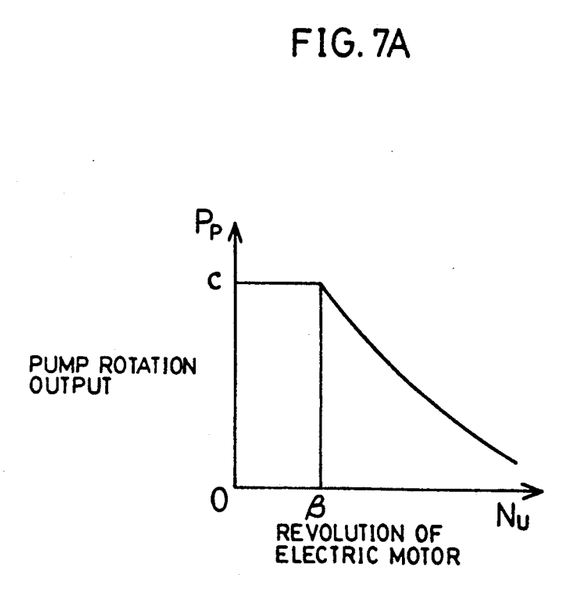
FIG. 7A to 7B illustrate another method of controlling the operation of the oil pump.
Figure 7B:
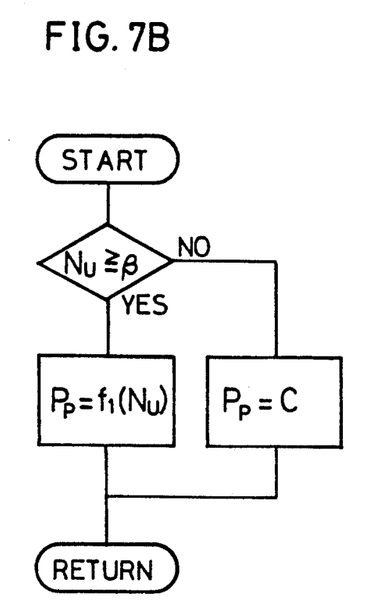

Furthermore, as shown in FIG. 7A, another setting can be arranged in which pump rotation output $P_p$ follows a function of a type which is gradually decrease corresponding to increase in rotational speed $N_u$ of the electric motor 6, that is $P_p = f_1(N_u)$ when rotational speed $N_u$ of the electric motor 6 becomes larger than constant rotational speed $\beta$. As a result of the control of the oil pump 27, energy can be saved and the electric motor 6 can be further effectively cooled. In this case, a control flow chart can be expressed as shown in FIG. 7B.

Figure 8A:
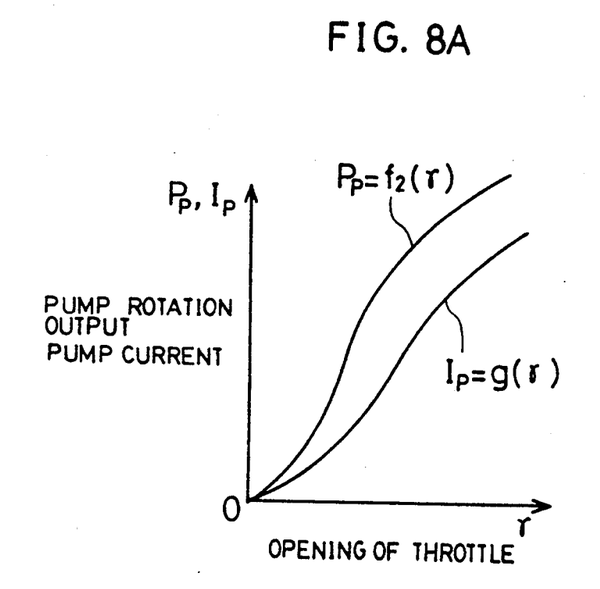
FIGS. 8A to 8B illustrate a still further method of controlling the operation of the oil pump.
Figure 8B:
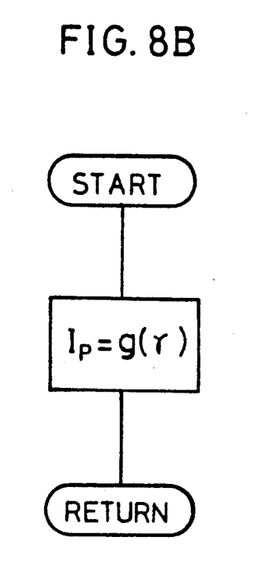

FIGS. 8A to 8B illustrate a method of controlling the oil pump 27 by using throttle opening as the control parameter.

As shown in FIG. 8A, the setting is formed in such a manner that pump rotation output $P_p$ follow a function of throttle opening $\gamma$, that is $P_p = f_2(\gamma)$. According to this function, the pump rotation output $P_p$ is arranged to increase in accordance with increase in throttle opening $\gamma$. The increase degree of this is set to be relatively small level when the throttle opening $\gamma$ is limited to a small level. In order to control the oil pump 27 as described above, electric current $I_p$ to be supplied to the electric motor 27b needs to be controlled in accordance with a function expressed by $I_p = g(\gamma)$ shown in FIG. 8A.

Therefore, according to this control method, when throttle opening $\gamma$ is small, load to be applied to the electric motor 6 can be considered to be small. Therefore, the operation of the oil pump 27 can be effectively controlled. In this case, a control flow chart can be expressed as shown in FIG. 8B.

On the other hand, aimed rotational speed $N_o$ can be defined with respect to the degree of accelerating pedal movement. Actual rotational speed $N_u$ of the electric motor 6 in major does not become this aimed rotational speed $N_u$ since the electric motor 6 is applied with a load. Therefore, a case can occur in which it is not effective merely by controlling the pump rotation output as a function of the throttle opening.

Figure 9A:
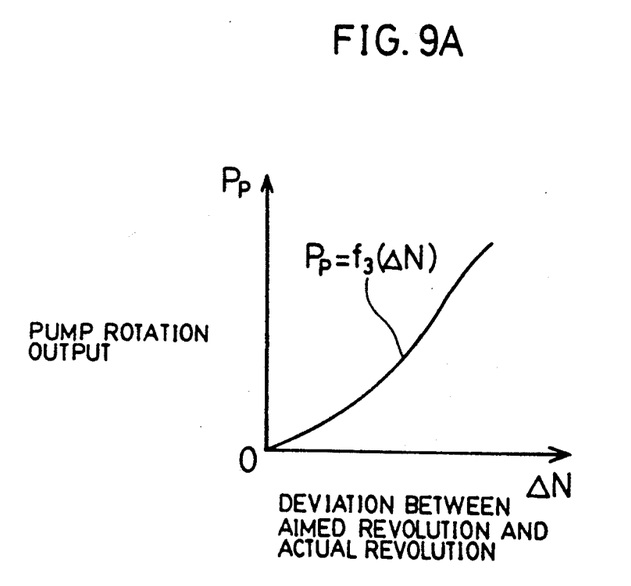
FIGS. 9A to 9B illustrate a furthermore method of controlling the operation of the oil pump.
Figure 9B:
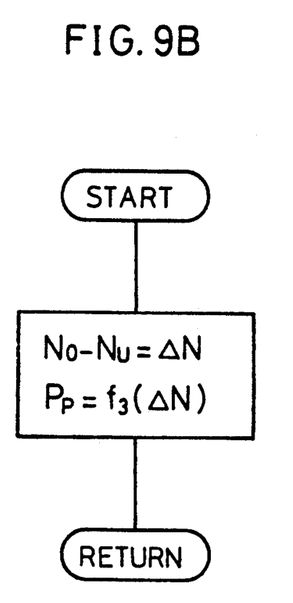

Therefore, a control can be performed in such a manner that: deviation $\Delta N = N_o - N_u$ between actual rotational speed $N_u$ and aimed rotational speed $N_o$ is assumed to be a load to be applied to the electric motor 6, and the oil pump 27 can be controlled as a function of this deviation $\Delta N$ as: $P_p = f_3(\Delta N)$. As a result of such control, the oil pump 27 can be further effectively controlled. A control flow chart in this case can be expressed as shown in FIG. 9B.

The control of the oil pump 27 described above is, without exception, performed by estimating heat generated by the electric motor 6, so to speak prevention of heat generation in the electric motor 6 is intended. On the other hand, another control may be performed in which a fact that the electric motor 6 actually generates heat is detected so as to control the oil pump 27.

Figure 10A:
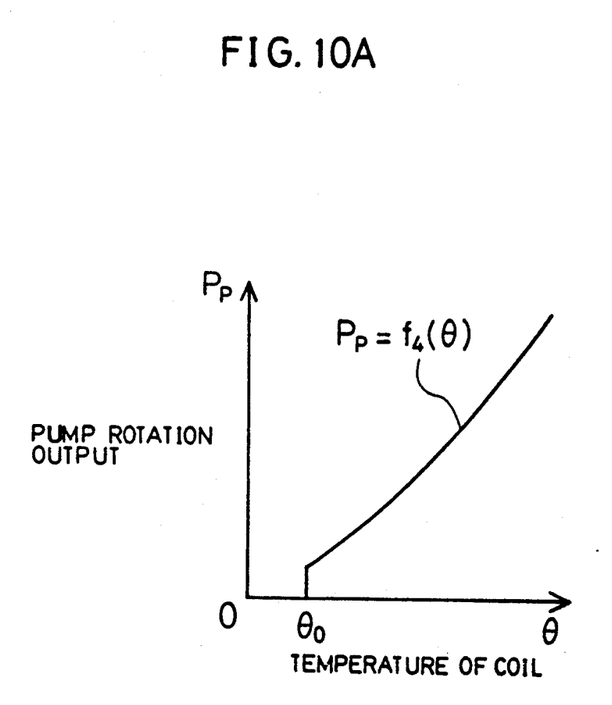
FIGS. 10A to 10B illustrate other method of controlling the operation of the oil pump.
Figure 10B:
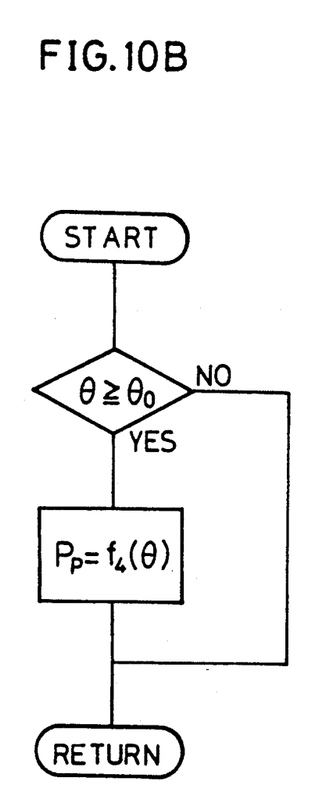

FIGS. 10A to 10B illustrate a control method of the type described above in which the oil pump 27 is controlled by using temperature of the coil 6d of the electric motor 6.

As shown in FIG. 10A, it is arranged that when temperature $\theta$ of the coil 6d exceeds a predetermined temperature $\theta_o$, the oil pump 27 is operated. In addition, the control of the operation of the oil pump 27 is performed depending upon function $P_p = f_4(\theta)$ which is a function of a type in which pump rotational speed $P_p$ increases in accordance with rise in coil temperature $\theta$. A control flow chart in this case can be expressed as shown in FIG. 10B As a result of such control, the electric motor 6 can be further assuredly performed.

The oil for cooling the electric motor 6 is arranged to pass through the bearings 7, 12, 16 and 17 and gears 20, 21, and 22 and so on to lubricate these members. By using the oil for cooling and lubricating purposes, an oil sheet becomes needless to be provided between the space 2a and the space 4a. As a result, a further smaller size electric motor can be obtained. Although, in the above-described embodiments, one end portion of the motor rotational shaft 6a is fitted within the recessed portion 9a formed in one end portion of the output rotational shaft 9, the present invention is not limited to this description. An arrangement may be employed in which a recessed portion is formed in an end portion of the motor rotational shaft 6a, and an end potion of the output rotational shaft 9 is fitted within this recessed portion.

Although in the above-described embodiment a braking device is accommodated in the casing 1, such braking device may be disposed outside the casing 1. As a result of this, the overall length of the motor driving device provided with a decelerator can be further shortened.

In addition, the oil pump 27 is disposed outside the casing 1 similarly to above-described case upon the braking device. As a result of such arrangement, a space for providing the oil pump 27 becomes needless, causing a possibility to reduce the size of the motor.

Furthermore, the motor driving device provided with a decelerator according to the present invention can be used as a wheel motor for electric vehicles, and the same can as well be used for other cases in which a small size and large output motor is needed.

As can be clearly seen from the above-described description, the motor driving device provided with the decelerator according to the present invention is structured in such a manner that the motor rotational shaft and the output rotational shaft are rotatably supported by the casing which accommodates the electric motor in such a manner the two ends of the two rotational shafts are supported each other. As a result, a wall for supporting each end of the two rotational shafts does not need to be provided in the casing. Therefore, the overall length of the motor can be reduced. Furthermore, since the motor rotational shaft and the output rotation shaft are arranged on one axis and the two rotational shafts are connected by the planetary gear decelerating device, the vertical dimension of the motor can be reduced.

Therefore, the overall size of the motor driving device provided with the decelerator can be reduced and the weight thereof can as well be reduced.

The diameter of a motor increases and efficiency of a motor becomes worse due to increase in core loss and copper loss when the rotational speed thereof is low level. On the other hand, the higher the rotational speed becomes, the smaller the diameter can be reduced, causing a high efficiency. According to the present invention, since a planetary gear decelerating mechanism exhibiting an excellent transmission efficiency is disposed on one axial, a reduced size high speed motor can be used, and the number of bearing can be reduced. As a result, mechanical loss can be reduced, and a motor driving device provided with a decelerator whose overall size is reduced can be obtained. Therefore, the same can be easily mounted on electric vehicles having a poor space for mounting it. Consequently, possibility of mounting the device can be improved.

What we claim is:

1. A motor driving vehicle provided with a decelerator, comprising
    a casing,
    an electric motor including a motor shaft with one end thereof rotatably supported on said casing, a rotor secured to said motor shaft, and a stator secured to said casing,
    an output shaft coaxially arranged with said motor shaft, said output shaft having one end thereof rotatably supported on said casing, said motor shaft and output shaft rotatably supporting each other by a bearing providing between respective other ends thereof;
    a planetary gear decelerator arranged between said motor shaft and output shaft having an input member connected to said motor shaft, an output member connected to said output shaft, and a reaction member fixed on said casing;
    a wheel secured to said output shaft, and
    brake disc means fixed to said casing, for braking said output shaft.

2. A motor driving vehicle provided with a decelerator according to claim 1, wherein said input member is a sun gear connected to said motor shaft, said output member is a carrier connected said output shaft, and said reaction member is a ring gear fixed on said casing.

3. A motor driving vehicle provided with a decelerator according to claim 1, wherein either said motor shaft or said output shaft is provided with a recessed portion and said motor shaft and said output shaft rotatably support each other by said bearing provided in said recessed portion.

4. An electric vehicle having a motor driving device provided with a decelerator, which comprises an electric motor, an output shaft coaxially arranged with a motor rotational shaft of said electric motor through a planetary gear decelerator, and a casing enclosing at least said electric motor and said planetary gear decelerator, said motor driving device being mounted on each wheel of said vehicle by said wheel being mounted on said output rotational shaft.

* * * * *